United States Patent
Nilsson et al.

(10) Patent No.: US 7,428,244 B2
(45) Date of Patent: Sep. 23, 2008

(54) DATA TRANSMISSION

(75) Inventors: Michael E. Nilsson, Ipswich (GB); Mohammed Ghanbari, Colchester (GB)

(73) Assignee: British Telecommunications Public Limited Company, London (GB)

(*) Notice: Subject to any disclaimer, the term of this patent is extended or adjusted under 35 U.S.C. 154(b) by 723 days.

(21) Appl. No.: 10/498,263

(22) PCT Filed: Dec. 5, 2002

(86) PCT No.: PCT/GB02/05532

§ 371 (c)(1), (2), (4) Date: Jun. 8, 2004

(87) PCT Pub. No.: WO03/051001

PCT Pub. Date: Jun. 19, 2003

(65) Prior Publication Data

US 2005/0007956 A1 Jan. 13, 2005

(30) Foreign Application Priority Data

Dec. 11, 2001 (EP) .................................. 01310356

(51) Int. Cl.
*H04J 3/16* (2006.01)

(52) U.S. Cl. ..................... 370/468; 370/235; 370/326; 370/422; 370/493

(58) Field of Classification Search ................. 370/252, 370/468, 465, 234, 235, 229, 226
See application file for complete search history.

(56) References Cited

U.S. PATENT DOCUMENTS 5,818,531 A * 10/1998 Yamaguchi et al. ...... 375/240.2

(Continued)

OTHER PUBLICATIONS

Vickers et al, "Adaptive multicast of multi-layered video: rate-based and credit based approaches", INFOCOM '98. Seventeenth Annual Joint Conference of the IEEE Computer and Communications Societies. Proceedings. IEEE San Francisco, CA, USA Mar. 29-Apr. 2, 1998, New York, NY, USA, IEEE, US, Mar. 29, 1998, pp. 1073-1083.

(Continued)

*Primary Examiner*—Ricky Ngo
*Assistant Examiner*—DeWanda Samuel
(74) *Attorney, Agent, or Firm*—Nixon & Vanderhye P.C.

(57) ABSTRACT

In order to measure the rate at which a terminal 2 can receive data from a source 5, 6, 7 the source temporarily increases it transmitting rate. The time taken to receive these higher-rate transmissions is measured at the terminal (or acknowledged by the terminal and measured at the transmitter) and the rate calculated. Inter alia, these measurements can be used for control of layered coding where apparatus for transmitting signals to video or other terminals 2 has coding means 5 for receiving the signals to generate a base signal stream B which is a coarse representation of the signal to be transmitted and at least one higher order stream E1, E2 containing finer detail of the signal not present in any lower order stream. These streams are sent by transmitting means 6 to the terminals, but at least some of the terminals do not receive all of the higher order streams. Control means 7 receives signals $X_k$ indicative of the measured data-receiving capacity of the terminals and calculates, based on the measured capacities, an adjustment for the coding means to make to the data rates of the streams.

19 Claims, 2 Drawing Sheets

U.S. PATENT DOCUMENTS

| | | | |
|---|---|---|---|
| 5,940,130 | A | 8/1999 | Nilsson et al. |
| 6,014,694 | A * | 1/2000 | Aharoni et al. ............. 709/219 |
| 6,105,064 | A | 8/2000 | Davis et al. |
| 6,215,774 | B1 | 4/2001 | Knauerhase et al. |
| 6,925,501 | B2 * | 8/2005 | Wang et al. ................. 709/231 |
| 7,043,560 | B2 * | 5/2006 | Coulombe et al. .......... 709/232 |
| 7,274,661 | B2 * | 9/2007 | Harrell et al. ............... 370/229 |
| 2001/0024470 | A1 * | 9/2001 | Radha et al. ............. 375/240.1 |

OTHER PUBLICATIONS

Zhao et al, "Dynamic quality of session control of real-time video multicast", Intelligent Processing Systems, 1997, ICIPS '97. 1997 IEEE International Conference on Beijing, China Oct. 28-31, 1997, New York, NY, IEEE, US, Oct. 28, 1997, pp. 1737-1741.

Ramanujan et al, "Adaptive streaming of MPEG video over IP networks", Local Computer Networks, 1997, Los Alamitos, CA, USA, IEEE Comput. Soc., US, Nov. 2, 1997, pp. 398-409.

Vickers et al., "Adaptive Multicast of Multi-layered Video:Rate-Based and Credit-Based Approaches", INFOCOM '98. Seventeenth Annual Joint Conference of the IEEE Computer and Communications Societies, Proceedings, IEEE San Francisco, CA, USA, Mar. 29-Apr. 2, 1998, New York, NY, USA, IEEE, US, Mar. 29, 1998, pp. 1073-1083.

Dongsheng et al., "Dynamic Quality of Session Control of Real-time Video Multicast", ICIPS '97, 1997 IEEE International Conference on Intelligent Processing Systems, Oct. 28-31, Beijing, China, pp. 1737-1741.

Ramanujan et al., "Adaptive Streaming of MPEG Video Over IP Networks", Proc. $22^{ND}$ International Conference on Local Computer Networks, Minneapolis Nov. 2-5, 1997, pp. 398-409.

ITU Study Group 16, Question 6, 2001: Document VCEG-N35.

Albuquerque et al, "A Source-Adaptive Multi-Layered Multicast Algorithm for Internet Video Distribution", Springer Book "Multimedia Internet Broadcasting", ISBN 1-85233-283-2, Dec. 2000.

International Search Report Jun. 23, 2003.

* cited by examiner

DATA TRANSMISSION

This application is the US national phase of international application PCT/GB021/05532 filed 5 Dec. 2002 which designated the U.S. and claims benefit of EP 01310356.9, dated 11 Dec. 2001, the entire content of which is hereby incorporated by reference.

BACKGROUND OF THE INVENTION

1. Field of Example Embodiments of the Invention

The present invention is concerned with data transmission, and more particularly to the measurement of capacity. Although of general application, a context of particular interest is multicast distribution, that is, where that a given signal feed (or recording) is to be distributed to a number of user terminals or receivers simultaneously. Commonly such material is distributed over digital telecommunications networks, for example, the internet or other internet protocol-based network.

2. Description of Related Art

The usual arrangement is that a source computer (the server) transmits the signals with a multicast address as the destination. A terminal (or client) that is to receive the signals corresponding to that multicast is said to join the corresponding multicast group: that is, the client's address is added to a list of group members, and routers within the network direct all packets which are addressed to that multicast address to all the member clients. In such circumstances the bit rate that can satisfactorily be received will vary from user to user, according, for example to the type of connection he has, and moreover is likely to vary with time, depending on the prevailing level of network congestion.

One method of accommodating this is by the use of layered coding (also called scalable coding). Here the idea is that one generates two bit-streams, one—the base layer—carrying a low-quality signal, and a second—the enhancement layer—carrying at least part of the information that is missing from the base layer, so that a receiver that receives both layers can reconstruct a high-quality signal by combining the information received in both layers. More than two layers can be used, in which case each successive enhancement layer carries information that is denied to those receiving only the lower layer(s). A receiver can then be sent only as many layers as the currently available link between the transmitter and the receiver can comfortably handle. In the event of network congestion, the number of layers sent to the particular receiver can be reduced by ceasing transmission of the highest layer of those that were previously being sent. Layered coding is often used for the transmission of video signals, for audio signals, or both. In principle however it can be applied to any type of material for which a signal of reduced bit-rate (and, hence, in some sense, reduced resolution) is worthwhile receiving.

For discussion of layered video coding, see M. Ghanbari, *Video Coding—an introduction to standard codecs*, IEE, 1999, pp. 131-150.

For discussion of layered multicast, see S. McCanne, 'Receiver driven layered multicast', Proceedings of SIG-COMM 96, Stanford. Calif. August 1996, and M. Nilsson, D. Dalby and J. O'Donnell, 'Layered Audiovisual Coding for Multicast Distribution on IP networks', Packet Video Workshop 2000, Cagliari, Italy.

A typical method of multicasting audiovisual material is that the audiovisual source multicasts layered audio and video over the IP network (internet). Each layer of audio and each layer of video is sent to a separate multicast address. Each client makes its own decision of how many layers to receive, and joins the appropriate multicast groups. The content would have previously been advertised, using for example, SDP (session description protocol), which would include the bit rates and the addresses of the different layers.

One difficulty with layered multicasting is that it is non-optimum for a client terminal which has a data-receiving capacity which falls just short of that needed to support a particular layer, as it must then drop down to the layer below effectively "wasting" some of the capacity. However Vickers et al ("Adaptive Multicast of Multi-Layered Video: Rate-Based and Credit-Based Approaches", IEEE 1998) have proposed using network feedback to dynamically adjust both the number of video layers it generates and the rate at which each layer is generated). The amount of bandwidth available is measured by a feedback packet which transverses the network and each network node marks the packet to indicate the amount of bandwidth available. A similar method, based on quality of voice measurements, is described by Zhao et al "Dynamic Quality of Session Control of Real-time Video Multicast" (1997 IEEE International Conference on Intelligent Processing Systems).

The Vickers et al method has the disadvantage that the network nodes have to be modified to provide the feedback. An alternative feedback method is discussed by Nilsson et al in the above-referenced paper, where the client determined what network capacity was available between it and the server by performing so-called join experiments, where the client randomly decides to join a higher layer, and then watches to see if the result is successful reception of the higher rate or packet loss across all layers. While this is reasonably satisfactory for a single client—some packet loss occurring when unsuccessful join experiments are conducted—it gets worse as more clients are involved, and make their own join experiments—as clients unaware of the join experiment may be affected by the packet loss resulting from an unsuccessful join experiment, and may incorrectly conclude that their network capacity from the server has reduced and so must reduce the number of layers received.

SUMMARY OF EXAMPLE EMBODIMENTS OF THE INVENTION

According to one aspect of the present invention there is provided a method of operating a telecommunications system in which a server transmits data to a terminal, wherein the method includes measuring the reception capacity of the terminal by:

(a) temporarily increasing the data rate of the data transmitted by the terminal, and (b) measuring the time taken to receive the data transmitted at the increased rate.

Other aspects of the invention are set out in the claims.

BRIEF SUMMARY OF THE DRAWINGS

Some embodiments of the invention will now be described, by way of example, with reference to the accompanying drawings, in which.

DETAILED DESCRIPTION OF EXAMPLE EMBODIMENTS OF THE INVENTION

Figure 1:
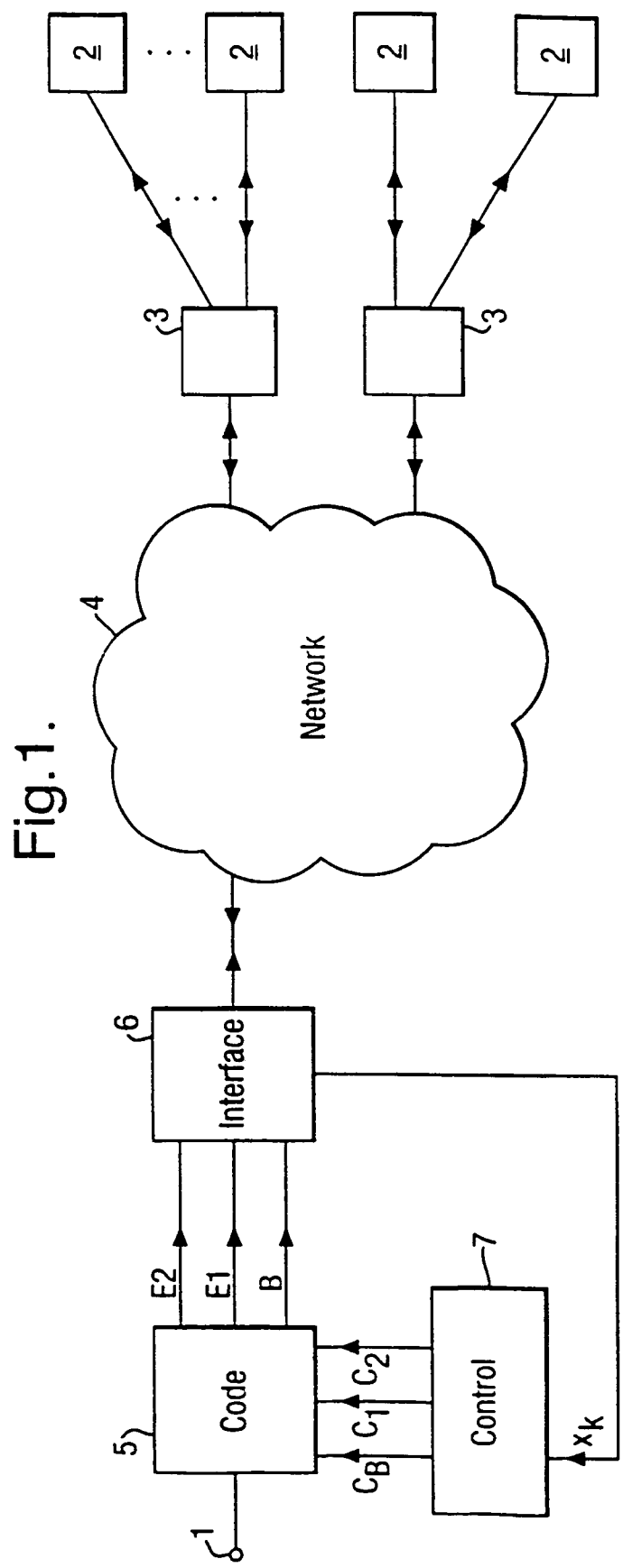
FIG. 1 is a block diagram of a multicast video distribution system.

The system now to be described is for multicast distribution of layered video, but, as discussed above, can equally lend itself to the distribution of audio signals or other signals for which layered coding is practicable. It receives a video feed at an input 1, in compressed digital form—for example according to the MPEG-2 standard. The pictures which it represents are to be distributed to a number of user terminals 2. Each terminal is connected via some connection (perhaps via a telephone network or ADSL link) to one of a number of service provider points 3 which provide access to a telecommunications network (such as the internet) indicated at 4. Video signals arriving at the input 1 are coded by a layered video transcoder 5 which has a base layer output B, and first and second enhancement layer outputs E1, E2. These outputs are supplied to a network interface 6 connected to the network 4.

In a conventional arrangement of this kind, the layers each operate at a fixed bit-rate. Each client terminal determines how many layers it may receive and joins the corresponding multicast groups accordingly. For example if each layer operates at 64 kbit/s and the bit rate available for the particular terminal is 160 kbit/s, then the maximum number of layers is two, and the client terminal joins the lower two multicast groups only, so that the terminal is sent only the base layer B and the first enhancement layer E1. If the network conditions change, this decision may be modified so that the terminal switches to receiving only the base layer, or to receiving all three layers.

It will be observed that such a system does not make for the best picture quality available: it the case of the numerical example quoted above, the terminal, although capable of receiving at 160 kbit/s, in fact is receiving at only 128 kbit/s. There is also the drawback that any terminal whose currently available bit-rate falls below the rate needed for the base layer will suffer complete loss of signal until conditions improve once again.

In the system now proposed, the transcoder 5 has control inputs $c_B, c_1, c_2$ by means of which the bit rate produced by the transcoder in each layer may be adjusted. A control unit 7 serves to receive, from the interface 6, signals $x_k$ indicating the current bit-rate capacity available for each of the terminals currently connected, and periodically makes a decision as to any changes to the bit rates to be employed by each layer and sends control signals to the transcoder control inputs to adjust, if necessary, the bit rate in one or more layers.

The details of implementation of this process are (i) to ascertain the rate $x_k$ at which each terminal k (k= 1 ... K) is able to receive data over the network;

(ii) the algorithm to be used by the control unit 7 to determine the layer rates;

(iii) control of the transcoder to operate at the new rates; and (iv) the process whereby the client terminals, following an adjustment to the layer rates, may change their decisions as to which layers to receive.

Considering first the available capacity, a first example of this may be implemented as follows.

The following example illustrates the principle of operation. Assume that the server is sending a single stream at 10 packets per second. Normally it would try to space these evenly every 100 ms. But if instead it sent 50 packets immediately, and then did nothing for the remainder of a 5 second period, before repeating the process for the next 50 packets etc, then (assuming the client is capable of receiving at this average rate of 10 packets per second) the time taken to receive this burst of 50 packets would give an indication of the throughput. So if they arrived in 2 seconds, it could conclude that it had the network capacity to receive an average of 25 (same sized) packets per second.

The impact on core network resources could be minimised by sending the higher layers in the gaps between bursts of packets in the lower layers, so that its overall output was a fairly constant packet rate. Note that for this technique to work, the server does not need to send packets back to back, but simply closer together in time than the client is capable of receiving.

Thus, the principle is (a) the server transmits packets at an average rate of p packets per second.

(b) normally these packets are transmitted fairly regularly.

(c) periodically, (perhaps every 60 seconds) the server transmits in burst mode for a period of time T (e.g. 5 seconds), comprising $T_B$ (e.g. 1) seconds during which it transmits packets at a rate of $pT/T_B$ per second followed by $T-T_B$ seconds during which it transmits no packets. The burst packets are labelled with a marker to indicate that they belong to such a burst.

(d) the client terminal (which is programmed with, or informed of, the parameters p, T, $T_B$) upon recognition of a burst packet marker, starts a timer which is stopped when all pT packets with this marker have been received.

(e) if the timer count is $T_R$ seconds, the client calculates the value $x_k=(pT-1)/T_R$ (to allow for fact that pT−1 packet intervals are timed, but pT packets are received).

(f) the client transmits this value $x_k$ to the server.

FIG. 1 illustrates this process in that the values $x_k$ are shown as being received from the terminals via the network and the interface 6.

Alternatively, assuming a protocol involving the acknowledgment of received packet is in use, the measurement process could be performed at the server, which would measure the time duration between the first and last receipt by the server of acknowledgements of the packets of a particular burst.

It should be noted that this method of capacity measurement has uses beyond the present context of rate control of multicast streams, and may be used in other situations in which the data receiving capacity of a terminal needs to be measured.

In a simplified system, the available capacity could be input manually by a user to the terminals, based on the user's knowledge that the terminal is connected via a particular type of link—e.g. a PSTN connection at 56 kbit/s or an ADSL connection at 1.5 Mbit/s. This is non-optimum, as it takes no account of variations in network congestion, but it would nevertheless represent a usable system.

Turning now to the control algorithm, the function of the control unit is to receive from each terminal a message stating the bit-rate currently available to it;

to determine any necessary adjustments to the bit-rates of the layers.

In the following description, references to the bit-rate of a layer mean the bit-rate of that layer alone, whilst the total bit rate of a layer is used to mean the bit-rate needed by a terminal using it, that is to say, the sum of the bit rates of that layer and all lower layers. Terminals receiving the base layer only are referred to as Group 0 terminals, terminals currently receiving only the base layer and layer E1 are referred to as Group 1 terminals, whilst terminals receiving all three layers are referred to as Group 2. References in the following description to a terminal receiving a particular layer imply, of course, that that terminal is also receiving all of the lower layers too.

The algorithm to be employed by the control unit is not simple to devise. For example, if a Group 1 terminal reports a capability of 150 kbit/s and the current total bit rate of layer E1 is 128 kbit/s (say 64 kbit/s for the base layer and 64 kbit/s for layer E1), then manifestly the correct response may well not be simply to increase the total bit-rate of layer E1 to 150 kbit/s, since this may not be within the capabilities of other Group 1 terminals, which would then be forced to drop back to the base layer. Also there is an interdependence of the layers in the sense that a more appropriate response to a Group 1 terminal reporting surplus capacity may under some circumstances be to lower the total bit-rate of layer E2 so that that terminal may then switch to Group 2. Also it makes no sense to adjust the bit rate such that one layer ends up having a zero or trivially small bit rate.

Two possible algorithms will now be described. In each case, the reported bit rate capability of terminal k of a total of K terminals is denoted by $x_k$.

a) Given the distribution of bit rate capabilities $x_k$,
the lowest layer bit rate $a_0$ is chosen to be the lower of a fixed minimum value $a_{0min}$ and a value $x_{PO}$ that exceeds the $x_k$ of no more than a fixed percentage $P_0$ (perhaps 0.1%) of the terminals, but may be increased to the lowest value of $x_k$ if this is greater, i.e.

$$a_0 = \text{Max}\{\text{Min}\{x_k\}, \text{Min}\{a_{0min}, x_{PO}\}\}$$

the other bit rates are chosen such that, of those terminals having $x_k$ greater than or equal to $x_0$, two thirds of them have values of $x_k$ greater than or equal to $(a_0+a_1)$ and one third have values of $x_k$ greater than of equal to $(a_0+a_1+a_2)$.

b) Another approach is derived from the idea that users are charged for the number of bytes or packets received, and that the server wants to maximise revenue.

In simple terms, the rates $a_0, a_1,$ and $a_2$ ... are chosen so that the sum, over all connected clients, of individual unused bit rate is minimised. For a given terminal k, with capacity $x_k$, between $a_0$ and $a_0+a_1$, (i.e. $a_0 < x_k < a_0 + a_1$) the unused bit rate would be $x_k - a_0$.

$$\text{Let } n_s = \sum_{i=0}^{s-1} a_i \quad \text{(i.e. } n_s \text{ is the total rate of } s \text{ layers)}$$

(i.e. $n_s$ is the total rate of s layers)

Suppose that terminal k operates at a bit rate $r_k$ which is the largest $n_s \leq x_k$ Choose $a_i$ (i=0 ... l) such as to minimise the unused capacity $$u = \sum_{k=1}^{K}(x_k - r_k) = \sum_{k=1}^{K} x_k - \sum_{k=1}^{K} r_k$$

Since, however, the $x_k$ are given, the task is to maximise the term $$v = \sum_{k=1}^{K} r_k$$

Given that $r_k$ is not a continuous function of $a_i$, an elegant solution of this maximisation problem seems improbable and thus we propose that the control unit is programmed to solve the problem by evaluating v for all possible values of $a_i$ within defined ranges, subject to some quantisation on the choices for $a_i$—perhaps multiples of 1 kbit/s.

Figure 2:
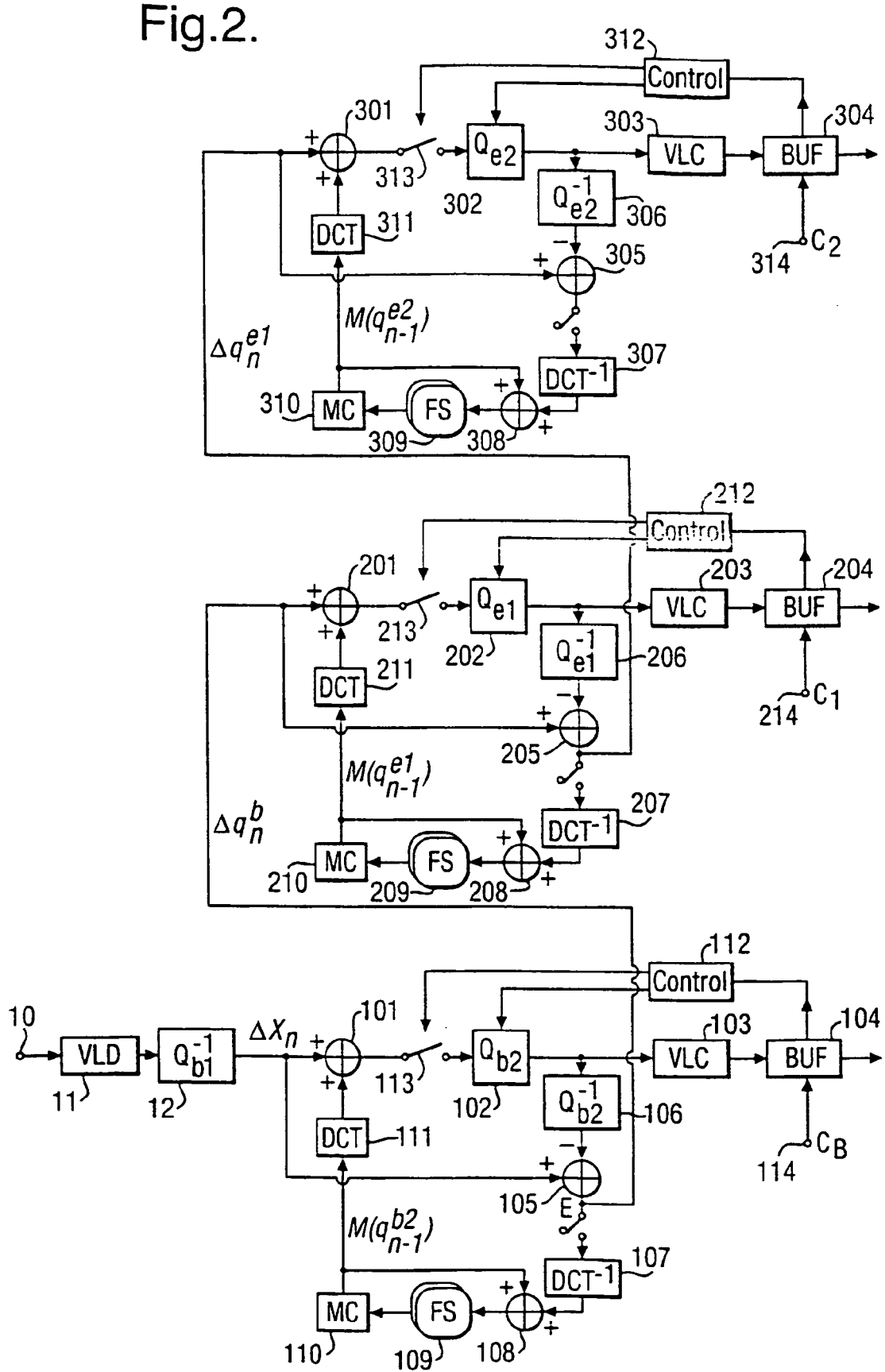
FIG. 2 is a block diagram of a layered video transcoder suitable for use ion the system of FIG. 1.

Having determined the bit rate for each layer, the control unit communicates the new rates to the transcoder Turning now to the transcoder, a block diagram of a layered transcoder with adjustable rates is shown in FIG. 2. This is a layered, SNR-scalable transcoder operating in accordance with the MPEG-2 standard. An incoming MPEG-2 signal at an input 10 firstly passes through a decoder 11 for variable-length codes, followed by an inverse quantiser 12 matched to the quantiser of the original encoder. The coefficients output from the inverse quantiser 12, after addition at 101 of a correction signal (to be described below) are requantised in a coarse quantiser 102 and variable-length coded at 103 to provide a base-layer signal which is then input to a buffer 104.

A subtractor 105 forms the difference between the coefficients at the output of the inverse quantiser 12, and those obtained via an inverse quantiser 106 from the base layer signal at the output of the quantiser 102. This difference signal, which represents the information now lacking from the first layer, forms the input to the next layer.

Drift correction (if required) is provided as follows. The difference signal from the subtractor 105 is converted from the frequency domain to the pixel domain by an inverse discrete cosine transform (DCT) unit 107 and then accumulated in a loop comprising an adder 108, a frame store 109 and a motion compensation unit 110 which receives motion vectors extracted (by means not shown) from the incoming signal. Note that the frame store 109 is shown as multiple stores, which are needed in systems such as MPEG which use an irregular inter-frame prediction sequence. The arrangements for switching between the stores are as in a conventional MPEG coder.

This accumulated drift is then converted to the frequency domain by a DCT unit 111 and added as a correction to the next frame via the adder 101.

A control unit 112 serves to sense the state of fullness of the buffer and to influence the rate of generation of data in such a manner as to ensure that the buffer neither overflows or becomes empty; this it does by controlling the step-size of the quantiser 102, or by causing frame-dropping by a switch 113, or both. Commonly in systems of this type, data would be read out of the buffer at a constant bit-rate. Here, however the buffer receives at a control input 114 the aforementioned control signal $C_B$ which serves to set the rate of a readout clock to the rate $a_0$ indicated by $C_B$.

In principle, the control unit 112 could use a conventional buffer control algorithm—that is, the rate control signal $C_B$ simply changes the readout rate and the control unit tracks this by monitoring the state of buffer fullness. In practice, however, it may be preferred to use the control signal $C_B$ to influence the transcoder more directly, for example simple rate control strategy is to set a picture dropping threshold proportional to the bit rate (such as 4 picture periods×bit rate), and to select the quantiser to be proportional to the buffer fill, so that the finest quantiser is used when the buffer is empty and the coarsest one is used when the level is the picture dropping threshold.

The first enhancement layer is constructed in identical manner to the base layer, and receives the output from the subtractor 105 at adder 201—components 201 to 214 are identical to components 101 to 114 of the base layer. The control input 214 receives the first enhancement layer control signal $C_1$. Similarly, the second enhancement layer has components 301 to 313 and control input 314 receiving the control signal $C_2$. Naturally, further layers could be added, on the same pattern, if desired.

In order to create the bursty transmission to allow the client to measure the network capacity, the readout rate on each layer need periodically to be temporarily increased. For this purpose, control signals $B_B$, $B_1$ and $B_2$ each consisting of a differently-phased 1-second pulse every 60 seconds are generated by the control unit 7 and supplied to the respective buffers 104, 204, 304 to increase the readout rate. Note that if this approach is adopted, to avoid the buffer control being affected it is necessary for the control units 112, 212, 312 to calculate the fullness that the relevant buffer would have had with uniform emptying. Alternatively, a second buffer could be added to each layer, with uniform packet transfer (at rate $a_i$) from the first, and bursty transmission from the second into the network.

Finally, there remains the question of how the clients make if necessary, a revised decision as to which layers they subscribe to. One possibility would be for them to follow the existing practice of "join experiments" as described in the introduction. A more attractive option, in the present context, is to make use of the fact that the data rate $x_k$ available to the client has already been determined. Thus the server notifies the clients of the new bit rates of each layer (via an SDP advertisement as mentioned earlier). The client then determines how many layers it can receive within the limit corresponding to $x_k$ for that terminal, and if necessary joins or leaves multicast groups so that it is sent those layers and no others.

Note: if the available data rates $x_k$ were to be measured by the server, then the server would need to communicate this information to the respective terminals. Alternatively, the server could perform the same calculation and instruct the client which groups to subscribe to.

Other forms of layered transcoder can also be used, including those with spatial scaling. Indeed, the control mechanisms envisaged here could (with uncompressed video input) be used in a system using layered encoders (as opposed to transcoders), or indeed to encoders and transcoders that produce hierarchies of independent streams, rather than adopting a layered approach.

What is claimed is:

1. A method of operating a telecommunications system in which a server transmits packets of data to a terminal, the method including measuring the reception capacity of the terminal by
   a) for a period of time, temporarily switching to a burst mode of transmission of data from the server to the terminal, in which a burst comprises a plurality of packets, in which the data rate during a burst is higher than the data rate in use prior to switching into the burst mode, and in which the average data rate over said period of time is equal to the data rate in use prior to switching into the burst mode, and
   b) measuring the time taken to receive the data that were transmitted at the higher rate.

2. A method according to claim 1 in which said measuring the time taken is performed by the terminal.

3. A method according to claim 1 in which the terminal sends acknowledgements of receipt of the transmitted packets of data to the server, and said measuring the time taken is performed by the server measuring the time taken to receive the acknowledgements of the packets transmitted at the increased rate.

4. A method of transmitting signals to a plurality of terminals comprising:
   a) coding the signals to generate a base signal stream which is a coarse representation of the signal to be transmitted and at least one higher order stream, where the or each higher order stream contains finer detail of the signal not present in any lower order stream;
   b) transmitting the streams to the terminals, where at least some of the terminals do not receive all of the higher order streams;
   c) measuring the data-receiving capacity of the terminals using the method of claim 1;
   d) calculating, based on the measured capacities, an adjustment to be made to the data rates of the streams.

5. A method according to claim 4 in which the or each higher order stream lacks information contained in a lower order stream, and in which each terminal receiving a higher order stream receives also all lower order streams.

6. A method according to claim 4 in which the streams are generated by a transcoder.

7. A method according to claim 4 in which calculation of data rates to be used for transmission is performed by selecting rates such that the numbers of terminals capable of receiving each stream shall be in predetermined proportions.

8. A method according to claim 4 in which calculation of data rates to be used for transmission is performed by calculating the difference between the total data-receiving capacity of the terminals and the total of the capacity required for each terminal to receive the highest quality signal requiring a bit rate less than or equal to its capacity, and calculating an adjustment to be made to the data rates of the streams such as to tend to reduce that difference.

9. A transmission system comprising a server for transmitting data packets to at least one a terminal for receiving data, wherein the server includes means operable to temporarily switch, for a period of time, to a burst mode of transmission of data from the server to the terminal, in which a burst comprises a plurality of packets, in which the data rate during a burst is higher than the data rate in use prior to switching into the burst mode, and in which the average data rate over said period of time is equal to the data rate in use prior to switching into the burst mode, and
   means operable to measure the time taken to receive the data that were transmitted at the higher rate.

10. A transmission system according to claim 9 in which the server is operable to measure the time taken to receive acknowledgements of the packets that were transmitted at the higher rate.

11. An apparatus for transmitting signals to a plurality of terminals comprising:
    a) coding means for receiving the signals to generate a base signal stream which is a coarse representation of the signal to be transmitted and at least one higher order stream, where the or each higher order stream contains finer detail of the signal not present in any lower order stream;
    b) means for transmitting the streams, in the form of data packets, to the terminals, whereby at least some of the terminals do not receive all of the higher order streams;
    c) control means operable
       (i) to temporarily switch, for a period of time, to a burst mode of transmission of data from the server to the terminal, in which a burst comprises a plurality of packets, in which the data rate during a burst is higher than the data rate in use prior to switching into the burst mode, and in which the average data rate over said period of time is equal to the data rate in use prior to switching into the burst mode;
       (ii) to receive signals indicative of the data-receiving capacity of the terminals, and
       (iii) to calculate, based on the measured capacities, an adjustment to be made to the data rates of the streams;
    the coding means being responsive to control signals from control means, based on the calculated adjustment, to adjust the rates of the streams.

12. An apparatus according to claim 11 in which the control means is operable to determine the data-receiving capacity of the terminals by measuring the time taken to receive acknowledgements of the packets that were transmitted at the higher rate.

13. An apparatus according to claim 11 in which the or each higher order stream lacks information contained in a lower order stream, in which each terminal receiving a higher order stream receives also all lower order streams.

14. An apparatus according to claim 11 in which the coding means is a transcoder.

15. An apparatus according to claim 11 in which the control means is arranged in operation to calculate data rates to be used for transmission by selecting rates such, that the number of terminals capable of receiving each stream will be in predetermined proportions.

16. An apparatus according to claim 11 in which the control means is arranged in operation to calculate data rates to be used for transmission by calculating the difference between the total data-receiving capacity of the terminals and the total of the capacity required for each terminal to receive the highest quality signal stream requiring a bit rate less than or equal to its capacity, and calculating an adjustment to be made to the data rates of the streams such as to tend to reduce that difference.

17. A method according to claim 1 in which each packet that is sent in a higher-rate burst carries a marker to distinguish it from other packets.

18. A transmission system according to claim 9 in which each packet that is sent in a higher-rate burst carries a marker to distinguish it from other packets.

19. An apparatus according to claim 11 in which each packet that is sent in a higher-rate burst carries a marker to distinguish it from other packets.

* * * * *